United States Patent
Kim et al.

(10) Patent No.: US 9,935,316 B2
(45) Date of Patent: Apr. 3, 2018

(54) NON-WOVEN FABRIC CURRENT COLLECTOR, METHOD OF FABRICATING BATTERY USING THE SAME, AND SYSTEM FOR FABRICATING THE SAME

(71) Applicant: JENAX INC., Busan (KR)

(72) Inventors: Chang Hyeon Kim, Chungcheongnam-do (KR); Min Gyu Choi, Sejong (KR); Lee Hyun Shin, Busan (KR)

(73) Assignee: JENAX INC., Busan (KR)

( * ) Notice: Subject to any disclaimer, the term of this patent is extended or adjusted under 35 U.S.C. 154(b) by 195 days.

(21) Appl. No.: 14/782,311

(22) PCT Filed: Apr. 30, 2014

(86) PCT No.: PCT/KR2014/003850
§ 371 (c)(1),
(2) Date: Oct. 2, 2015

(87) PCT Pub. No.: WO2014/178646
PCT Pub. Date: Nov. 6, 2014

(65) Prior Publication Data
US 2016/0049662 A1    Feb. 18, 2016

(30) Foreign Application Priority Data
May 3, 2013 (KR) .................... 10-2013-0050054

(51) Int. Cl.
*H01M 4/00* (2006.01)
*H01M 4/80* (2006.01)
(Continued)

(52) U.S. Cl.
CPC .......... *H01M 4/806* (2013.01); *H01M 4/043* (2013.01); *H01M 4/667* (2013.01)

(58) Field of Classification Search
CPC .......... H01M 4/64; H01M 4/66; H01M 4/661; H01M 4/668; H01M 4/70; H01M 4/72;
(Continued)

(56) References Cited

U.S. PATENT DOCUMENTS

2013/0177787 A1* 7/2013 Arima .................. H01M 2/348
429/62
2014/0093760 A1* 4/2014 Hermann .............. H02J 7/0075
429/66

FOREIGN PATENT DOCUMENTS

JP         3733070      10/2005
JP         2009-146846   7/2009
(Continued)

OTHER PUBLICATIONS

International Search Report dated Aug. 29, 2014 for PCT/KR2014/003850.
(Continued)

*Primary Examiner* — Stewart A Fraser
*Assistant Examiner* — Monique M Wills

(57) ABSTRACT

Provided are a non-woven fabric current collector and a method and system of fabricating a battery using the same. The non-woven fabric current collector comprises a upper conductive non-woven fabric sheet and a lower conductive non-woven fabric sheet including a network of a conductive fibers; and a tension reinforcing layer that has a greater tensile strength than the conductive non-woven fabric sheets, arranged between the upper conductive non-woven fabric sheet and the lower conductive non-woven fabric sheet, mediates adhesion between the upper conductive non-woven fabric sheet and the lower conductive non-woven fabric sheet, and has pores via which the upper conductive non-woven fabric sheet and the lower conductive non-woven fabric sheet communicate with each other.

24 Claims, 6 Drawing Sheets

(51) Int. Cl.
    *H01M 4/66*    (2006.01)
    *H01M 4/04*    (2006.01)

(58) Field of Classification Search
    CPC ........ H01M 4/74; H01M 4/742; H01M 4/745; H01M 4/747
    See application file for complete search history.

(56) References Cited

FOREIGN PATENT DOCUMENTS

| | | |
|---|---|---|
| JP | 2010-092607 | 4/2010 |
| JP | 2011-142071 | 7/2011 |
| KR | 10-0264387 | 8/2000 |
| KR | 10-0318972 | 1/2002 |
| KR | 10-2006-0083233 | 7/2006 |
| KR | 10-0614166 | 8/2006 |
| KR | 10-2006-0102745 | 9/2006 |
| KR | 10-0676356 | 1/2007 |
| KR | 10-0731417 | 6/2007 |
| KR | 10-0977345 | 8/2010 |
| KR | 10-2011-0138862 | 12/2011 |
| KR | 10-2012-0039473 | 4/2012 |
| KR | 10-2012-0107118 | 9/2012 |
| KR | 10-2012-0111508 | 10/2012 |
| KR | 10-1227321 | 1/2013 |

OTHER PUBLICATIONS

Written Opinion of the International Search Report dated Aug. 29, 2014 for PCT/KR2014/003850.

* cited by examiner

NON-WOVEN FABRIC CURRENT COLLECTOR, METHOD OF FABRICATING BATTERY USING THE SAME, AND SYSTEM FOR FABRICATING THE SAME

This application claims the priority of Korean Patent Application No. 10-2013-0050054, filed on May 3, 2013 in the KIPO (Korean Intellectual Property Office), the disclosure of which is incorporated herein entirely by reference. Further, this application is the National Stage application of International Application No. PCT/KR2014/003850, filed Apr. 30, 2014, which designates the United States and was published in Korean. Each of these applications is hereby incorporated by reference in their entirety into the present application.

TECHNICAL FIELD

The present invention relates to a battery technology, and more particularly, to a non-woven fabric current collector, a method of fabricating a battery using the same, and a system for fabricating the same.

BACKGROUND ART

Along with the dramatic developments in semiconductor fabrication technologies and communication technologies during the last 20 years, researches and commercialization have been widely performed on lithium-ion batteries as power supplies for portable electronic devices, such as mobile communication terminals and laptop computers. Recently, to handle environmental problems including energy exhaustion and the greenhouse effect, demands for energy saving technologies are rapidly increasing. As a result, researches are actively performed on medium and large size batteries applicable not only to industries related to portable electronic devices, but also to electronic vehicles, hybrid vehicles, or power grids. As batteries for the purpose, nickel-metal hydride (Ni-MH) batteries and lithium secondary batteries are mainly researched. Here, since a lithium secondary battery utilizes lithium, which is the lightest metal with the lowest standard reduction potential from among known metals in nature, a battery with high energy density, high voltage, and high power output may be fabricated.

To embody such performance of a battery, it is important to develop a suitable current collector. It is necessary for a current collector to secure improved internal resistance and irreversibility to improve performance of a battery. At the same time, it is necessary to secure high yield for economic feasibility of fabricating the same.

DISCLOSURE OF THE INVENTION

Technical Problem

The present invention provides a current collector that exhibits high energy density, excellent charging/discharging efficiency, excellent charging/discharging rate, and excellent cycle characteristics with high yield for economic feasibility of fabricating the same.

The present invention also provides a method of fabricating a battery with reproducibility and reliability by using a non-woven fabric current collector having the above-stated advantages.

The present invention also provides a system for fabricating a battery having the above-stated advantages.

Technical Solution

According to an aspect of the present invention, there is provided a non-woven fabric current collector including a upper conductive non-woven fabric sheet and a lower conductive non-woven fabric sheet including a network of a conductive fibers; and a tension reinforcing layer that has a greater tensile strength than the conductive non-woven fabric sheets, arranged between the upper conductive non-woven fabric sheet and the lower conductive non-woven fabric sheet, mediates adhesion between the upper conductive non-woven fabric sheet and the lower conductive non-woven fabric sheet, and has pores via which the upper conductive non-woven fabric sheet and the lower conductive non-woven fabric sheet communicate with each other.

Tensile elongation ratio of the non-woven fabric current collector is within a range from about 2% to about 10%. Yield strength of the non-woven fabric current collector is within a range from about 1 kgf/cm to about 100 kgf/cm.

The conductive fibers include carbon fibers, conductive polymer fibers, polymer fibers coated with a metal layer or a conductive polymer layer, or hollow metal fibers.

According to some embodiments, metal layer or a conductive polymer layer is formed on the conductive fibers. Furthermore, the upper conductive non-woven fabric sheet or the lower conductive non-woven fabric sheet further includes a conductive material and a binder for fixing the conductive material on the conductive fibers.

According to some embodiments, the upper conductive non-woven fabric sheet or the lower conductive non-woven fabric sheet further includes fiberized linear binders mixed with the conductive fibers. The linear binders include polyethylene (PE), polypropylene (PP), polyethylene terephthalate (PET), polypropylene terephthalate (PPT), nylon, polyethylene naphthalate (PEN), polyether sulfone (PES), polyether etherketone (PEEK), polyphenylene sulfide (PPS), polyvinyliden fluoride (PVDF), a copolymer thereof, or a mixture thereof.

Furthermore, the metal filaments contains a stainless steel, aluminum, nickel, titanium, copper, silver, gold, cobalt, tin, bismuth, lead, antimony, zinc, iron, cadmium, an alloy thereof, or a metal compound to be alloyed/dealloyed with lithium. The non-woven fabric current collector of claim 1, further including a coating layer of an electrically active material on the conductive fibers of the upper conductive non-woven fabric sheet and the lower conductive non-woven fabric sheet. Furthermore, the metal filaments include two or more types of metal filaments containing different metals.

The upper conductive non-woven fabric sheet and the lower conductive non-woven fabric sheet are combined with each other by being adhered to the tension reinforcing layer. Selectively, the upper conductive non-woven fabric sheet and the lower conductive non-woven fabric sheet are combined with each other by being bridged with each other via the pores of the tension reinforcing layer.

According to some embodiments, an average size of the pores of the tension reinforcing layer is identical to or greater than an average size of pores in the network of the upper conductive non-woven fabric sheet and the lower conductive non-woven fabric sheet.

The tension reinforcing layer includes a non-woven fabric structure, a woven fabric structure, a mesh structure, a structure including fibers extending in a certain direction, or a combination thereof. The tension reinforcing layer selectively increases tensile strength in a certain direction parallel to the main surface of the non-woven fabric current collector. The direction of increased tensile strength is a direction perpendicular to the revolution axis of a roller employed in a rolling operation for continuously performing battery fabricating operations or a direction perpendicular to the center axis of a roller employed in a jelly roll forming operation.

The tension reinforcing layer includes a polymer material, a metal, or a combination thereof. The polymer material includes a derivative including polyethylene (PE), polypropylene (PP), polyethylene terephthalate (PET), polypropylene terephthalate (PPT), polyacrylonitryl (PAN), nylon, polyethylene naphthalate (PEN), polyether sulfone (PES), polyether etherketone (PEEK), polyphenylene sulfide (PPS), polyvinyliden fluoride (PVDF), and a copolymer thereof. The metal includes copper, aluminum, a stainless steel, nickel, or an alloy thereof.

According to some embodiments, the non-woven fabric current collector further includes a conductive pattern that partially blocks pores between networks of the conductive fibers on at least one surface of the non-woven fabric current collector. The conductive pattern includes a linear pattern including lines that are apart from one another at a certain interval to expose pores on the surface of the non-woven fabric current collector. A battery tab or lead is formed on the lines.

According to another aspect of the present invention, there is provided a method of fabricating a battery, the method including providing a upper conductive non-woven fabric sheet including a network of conductive fibers; providing a lower conductive non-woven fabric sheet including a network of conductive fibers; providing a tension reinforcing layer having a greater tensile strength than the conductive non-woven fabric sheets and including pores between the upper conductive non-woven fabric sheet and the lower conductive non-woven fabric sheet; forming a non-woven fabric current collector by combining the upper conductive non-woven fabric sheet and the lower conductive non-woven fabric sheet with each other via the tension reinforcing layer; and filling the non-woven fabric current collector with an active material.

The combining of the upper conductive non-woven fabric sheet and the lower conductive non-woven fabric sheet with each other is performed via a fusion-adhesion or bridging. The bridging is performed via needle punching spun lacing, or stitch bonding.

Tensile elongation ratio of the non-woven fabric current collector is within a range from about 0.1% to about 10%. Yield strength of the non-woven fabric current collector is within a range from about 0.1 kgf/cm to about 100 kgf/cm.

According to another aspect of the present invention, there is provided a battery fabricating system including a first supplying device for continuously supplying a upper conductive non-woven fabric sheet; a second supplying device for continuously supplying a lower conductive non-woven fabric sheet; a third supplying device for continuously supplying a tension reinforcing layer between the upper conductive non-woven fabric sheet and the lower conductive non-woven fabric sheet; and a combining device for forming an non-woven fabric current collector by combining the upper conductive non-woven fabric sheet and the lower conductive non-woven fabric sheet to each other via the continuously supplied tension reinforcing layer.

According to some embodiments, the combining device includes an energy applying device for applying heat, an infrared ray, an ultraviolet ray, an electron beam, or an ultrasound wave to the non-woven fabric current collector for melting and adhering the upper conductive non-woven fabric sheet, the lower conductive non-woven fabric sheet, and the tension reinforcing layer to one another.

Advantageous Effects

According to an embodiment of the present invention, by employing a conductive non-woven fabric sheet including a network of conductive fibers, energy density of a battery may be improved as effects of reduced internal resistance and increased interface based on excellent electric characteristics and flexibility and systemic strength of fibers. Furthermore, a battery with improved charging/discharging speed, charging/discharging efficiency, and cycle characteristics may be obtained. Furthermore, since a tension reinforcing layer is provided in the conductive non-woven fabric sheet, mechanical tensile strength is improved, thereby preventing increase of internal resistance based on possible deformation of a non-woven fabric current collector that may occur during continuous operations using a winding device or a battery packaging operation, such as a jelly roll forming operation and improving a productivity by resolving defects based on yields.

According to another embodiment of the present invention, a method of fabricating a battery using a non-woven fabric current collector having the above-stated advantages is provided.

According to another embodiment of the present invention, a system for fabricating a battery by using a non-woven fabric current collector having the above-stated advantages may be provided.

MODE FOR CARRYING OUT THE INVENTION

Figure 1A:
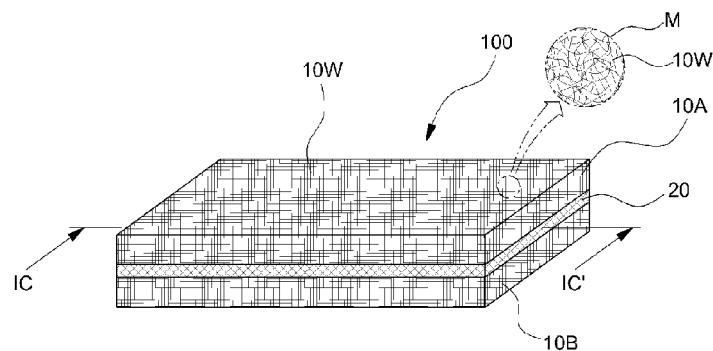
FIG. 1A is perspective view of a non-woven fabric current collector according to an embodiment of the present invention.

Hereinafter, exemplary embodiments will be described in detail with reference to accompanying drawings.

The invention may, however, be embodied in many different forms and should not be construed as being limited to the embodiments set forth herein; rather, these embodiments are provided so that this disclosure will be thorough and complete, and will fully convey the concept of the invention to those skilled in the art.

Furthermore, in the drawings, the thicknesses of layers and regions are exaggerated for clarity, and like reference numerals in the drawings denote like elements. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although numerical terms (e.g., "first" and "second") are used herein to describe various members, parts, regions, layers and/or sections, these members, parts, regions, layers and/or sections are not to be limited by these terms. These terms are only used to distinguish one member, part, region, layer or section from another member, part, region, layer or section. Thus, for example, a first member, part, region, layer or section discussed below could be termed a second, part, region, layer or section without departing from the teachings of the illustrated embodiments.

Figure 1B:
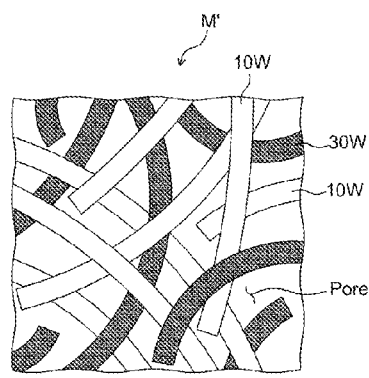
FIG. 1B is a partial view of the non-woven fabric current collector according to another embodiment of the present invention.
Figure 1C:
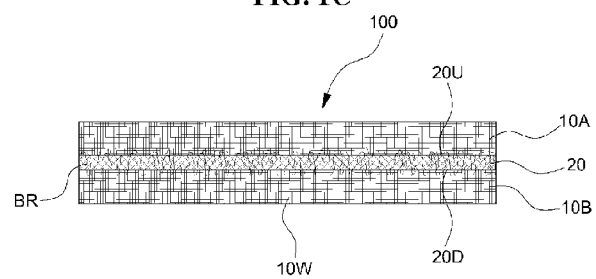
FIG. 1C is a sectional view of the non-woven fabric current collector cut along a line IC-IC' of FIG. 1A.

FIG. 1A is perspective view of a non-woven fabric current collector 100 according to an embodiment of the present invention, FIG. 1B is a partial view of the non-woven fabric current collector 100 according to another embodiment of the present invention, and FIG. 1C is a sectional view of the non-woven fabric current collector 100 cut along a line IC-IC' of FIG. 1A.

Referring to FIG. 1A, the non-woven fabric current collector 100 includes an upper conductive non-woven fabric sheet 10A and a lower conductive non-woven fabric sheet 10B. The upper conductive non-woven fabric sheet 10A and the lower conductive non-woven fabric sheet 10B may include conductive fibers 10W as shown in the partially magnified view M. The conductive fibers 10W form a path for transferring electrons and may be used as a current collector. In this case, a metal foil, which is conventionally used as a current collector, may be omitted in the non-woven fabric current collector 100. However, according to some embodiments, a metal foil may be combined onto a surface of the non-woven fabric current collector 100.

The conductive fibers 10W have a non-woven fabric structure in which the conductive fibers 10W are randomly tangled with one another. As shown in the partially magnified view M, the plurality of conductive fibers 10W have irregularly curved shapes and are electrically connected to one another via physical contacts or chemical incorporations, thereby forming a conductive network. Since the conductive network is formed as the conductive fibers 10W are curved or bent and are tangled with one another, contact one another, and are combined with one another, the conductive network has pores therein, but is mechanically strong. Furthermore, due to fabric characteristics, the conductive network may be flexible. Since an electrolyte may be easily introduced via the pores, and thus positive ions for chemical reactions of a battery, such as lithium ions, may be transferred.

The plurality of conductive fibers 10W are metal filaments, carbon fibers, conductive polymer fibers, polymer fibers coated with a metal layer or a conductive polymer layer (e.g., polyolefin fibers coated with a metal), or hollow metal fibers (e.g., fibers formed by forming sacrificing cores using carbon fibers or polymer fibers, coating a metal layer on the sacrificing cores, and removing the sacrificing cores by oxidizing or combusting the sacrificing cores to remain the metal layer) and, preferably, are metal filaments.

According to some embodiments, a metal layer or a conductive polymer layer may be further formed on the conductive fibers 10W to reduce contact resistance and improve bonding force between the conductive fibers 10W. For example, a conductive polymer layer or a metal layer may be coated on carbon fibers or metal filaments. Furthermore, a suitable reactive interface layer or a buffer layer for improving bonding force may be formed between the metal layer or the conductive polymer layer and surfaces of the plurality of conductive fibers 10W.

The metal filaments may be fibrous bodies containing a stainless steel, aluminum, nickel, titanium, copper, silver, gold, cobalt, zinc, the above-stated electrically active material, or an alloy thereof, For example, aluminum filaments may be used for a positive electrode, whereas copper or nickel filaments may be used for a negative electrode. According to another embodiment of the present invention, the above-stated materials may have stacked structures in which the above-stated metals are sequentially stacked, may include layers partially oxidized via heat treatments, or may include interlayer compounds. Furthermore, metal filaments may be formed of different types of metals, and thus heterogeneous metal filaments may constitute each of the conductive non-woven fabric sheets 10A and 10B.

The metal filaments may have thicknesses from about 1 µm to about 200 µm. If thicknesses of the metal filaments are below 1 µm, it is difficult to form filaments with uniform material properties, e.g., uniform resistance, and it is difficult to coat an electrically active material thereon. Furthermore, if thicknesses of the metal filaments exceed 200 µm, surface area per volume of the metal filaments decreases. Therefore, it is difficult to obtain improved battery performance based on increased surface area, and energy density is reduced. Furthermore, as the effect for restraining an electrically active material impregnated into a non-woven fabric current collector is deteriorated, the electrically active material may be peeled off from conductive filaments during repeated charging and discharging operations, and thus cycle characteristics of a battery may be deteriorated.

According to some embodiments, a metal filament may preferably have a thickness from about 2 µm to about 20 µm. When it is changed to a surface area to volume ratio per unit length (e.g., if a metal filament has a circular cross-section, 4/diameter), the surface area to volume ratio is from about $4 \times 10^5$ (1/m) to about $2 \times 10^6$ (1/m). Generally, a conventional current collector employing a metal foil has a thickness of about 20 µm. Metal filaments having thicknesses from about 2 µm to about 20 µm have a surface area that is from about four times to about forty times greater than that of the conventional current collector employing a metal foil. A surface area of a current collector refers to a surface area of a conductive network per volume of an electrode regarding the conductive fibers 10W forming reactive interfaces respectively against an electrically active material and an electrolyte. Therefore, a battery with significantly increased energy density may be obtained by maximizing the surface area of the current collector.

According to some embodiments, an average length of metal filaments may be from about 5 mm to about 1000 mm. In this case, an average aspect ratio of the metal filaments is from about 25 to about 106. If necessary, the metal filaments may be segmented to have lengths from about 5 cm to about 8 cm and form a non-woven fabric structure.

According to another embodiment, metal filaments constituting a conductive network may have one or more of length or thickness different from one another. For example, a non-woven fabric current collector may be formed by mixing long filaments and short filaments. A ratio of length of a short filament to a long filament may be from about 1% to about 50%. Long filaments may determine overall conductivity and mechanical strength of a non-woven fabric current collector, whereas short filaments may determine internal resistance of a battery by improving electron transferring paths between an electrically active material and the long filaments or electrical connections between the long filaments.

The metal filament feature properties of metals, that is, excellent heat-resistance, plasticity, and electric conductivity compared to those of other materials and may be used in fabric fabricating operations, such as a non-woven fabric processing operation. Therefore, such material advantages may be maintained throughout the metal filaments having lengths substantially equal to or greater than 5 mm, and thus, compared to other materials, such as polymer fibers coated with a conductive material, an operational burden for a bridging operation or a thermal operation may be relatively small and a fabricating process window may be relatively wide.

According to some embodiments, a conductive material may be coated onto the plurality of conductive fibers 10W. The conductive material may be pre-coated onto the plurality of conductive fibers 10W before formation of a non-woven fabric or attachment of a tension reinforcing layer described below. Alternatively, the conductive material may be post-coated onto the plurality of conductive fibers 10W by using a suitable dispersing solvent in a follow-up operation thereafter. The conductive material may be carbon black, acetylene black, ketjen black, fine carbon like superfine graphite particles, a nano metal particle paste, an indium tin oxide (ITO) paste, carbon nanotubes, or other nano structures with large specific surface areas and low resistances. However, the present invention is not limited thereto. In an electrode employing the non-woven fabric current collector 100, the conductive material prevents increase of internal resistance and lifespan deterioration of a battery that may occur when an electrically active material is peeled off from the conductive fibers 10W or physical contact between the conductive fibers 10W is weakened based on volume change caused by charging and discharging of the battery.

According to some embodiments, a binder may be pre-coated or post-coated on the plurality of conductive fibers 10W, together with the conductive material, to fix the conductive material on the plurality of conductive fibers 10W. The binder not only fixes the conductive material onto the plurality of conductive fibers 10W, but also fixes the plurality of conductive fibers 10W to one another or fixes an impregnated electrically active material. For example, the binder may be a polymer binder, such as polyvinylidene-fluoride (PVdF), styrenebutadiene rubber (SBR), polyimide, a polyurethane-based polymer, a polyester-based polymer, and an ethylene-propylenediene copolymer (EPDM).

Referring to FIG. 1B, non-woven fabric sheets 10A and 10B according to another embodiment of the present invention may further include fiberized linear binders 30W dispersed with the conductive fibers 10W. The linear binders 30W may contain a polymer material advantageous for fiberization. For example, the linear binders 30W may contain a derivative or a mixture, such as polyethylene (PE), polypropylene (PP), polyethylene terephthalate (PET), polypropylene terephthalate (PPT), nylon, polyethylene naphthalate (PEN), polyether sulfone (PES), polyether etherketone (PEEK), polyphenylene sulfide (PPS), polyvinyliden fluoride (PVDF), and a copolymer thereof. However, the above-stated materials are merely examples, and the present invention is not limited thereto. The linear binders 30W may contain a functional polymer material with suitable mechanical properties or a heat-resistance, such as highly strong, highly elastic, and magnetic contractive fiber.

In terms of fabricating, after the linear binders 30W are randomly mixed with the conductive fibers 10W, a non-woven fabric structure may be obtained via a bridging operation or a combination structure of the linear binders 30W and the conductive fibers 10W may be obtained via a fiber blending operation. An electrode may be fabricated by using a solvent-free dry powder impregnation method for impregnating electrically active material described below into the pores between the conductive fibers 10W and the linear binders 30W into the non-woven fabric current collector 100 in the form of dried powders instead of slurries and heating and pressing the non-woven fabric current collector 100. In this case, no harmful liquid material, such as water or an organic solvent for forming slurries, is used, environmental burden is small. Furthermore, unlike impregnation of an electrically active material in the form of slurries, no drying operation for removing the solvent is necessary. As a result, simplification of the overall process, improved productivity, and simplification of equipment may be embodied. Furthermore, if the solvent remains in an electrode, an electrically active material may be deteriorated, and thus a mixing operation using the solvent-free dry powders may improve lifespan of a battery.

Electrically active materials (not shown) may be impregnated into the non-woven fabric current collector 100 via the pores in the form of slurries or powders or may be coated onto the conductive fibers 10W. According to another embodiment of the present invention, the conductive fibers 10W may be formed of an electrically active material, and thus the conductive fibers 10W may function as an electrically active material. Selectively, an electrically active material may be pre-coated onto the conductive fibers or an electrically active material may be additionally impregnated via pores of conductive fibers formed of an electrically active material.

In case of a positive electrode, the electrically active material may be a material from among $LiNiO_2$, $LiCoO_2$, $LiMnO_2$, LiFePO4, and $LiV_2O_5$. However, the above-stated materials are merely examples, and the present invention is not limited thereto. For example, an electrically active material for a positive electrode may be selected from among oxides, phosphates, sulfides, and fluoride having two or more components including lithium, nickel, cobalt, chromium, magnesium, strontium, vanadium, lanthanum, cerium, iron, cadmium, lead, titanium, molybdenum, or manganese or a combination thereof. For example, an electrically active material for a positive electrode may be ternary or more component compound, such as Li[Ni, Mn, Co]$O_2$.

In case of a negative electrode, the electrically active material may contain a carbon material (a low crystalline carbon like soft carbon or hard carbon/a high crystalline carbon including a high temperature pyrolytic carbon, such as natural graphite, Kish graphite, pyrolytic carbon, mesophase pitch based carbon fibers, meso-carbon microbeads, mesophase pitches, and petroleum or coal tar pitch derived cokes)/ketjen black/acetylene black/metal lithium/silicon (Si) or a Si-based compound, such as a silicon oxide/tin (Sn), an alloy thereof, or a Sn-based compound, such as $SnO_2$/ bismuth (Bi) or a compound thereof/lead (Pb) or a compound thereof/antimony (Sb) and a compound thereof/zinc (Zn) and a compound thereof/iron (Fe) and a compound thereof/cadmium (Cd) and a compound thereof/and aluminum (Al) a compound thereof. However, the present invention is not limited thereto. For example, the electrically active material may contain nay of other metals, metalloids, and nonmetals, which may intercalate and de-intercalate lithium or alloyed and dealloyed with lithium, or compounds thereof, such as oxides thereof, nitrides thereof, and fluorides thereof. Furthermore, the electrically active material may include sodium suitable for a NaS battery or at least one from among other oxides, carbides, nitrides, sulfides, phosphides, celenides, and tellurides.

According to some embodiments, to restrain particles of electrically active material, a polymer binder, such as polyvinylidenefluoride (PVDF), styrenebutadiene rubber (SBR), polyimide, a polyurethane-based polymer, a polyester-based polymer, and an ethylene-propylenediene copolymer (EPDM) may be added. Furthermore, together with the binder, carbon black, acetylene black, ketjen black, fine carbon like superfine graphite particles, a nano metal particle paste, an indium tin oxide (ITO) paste, carbon nanotubes, or other nano structures with large specific surface areas and low resistances may be added.

Referring to FIGS. 1A and 1C, a tension reinforcing layer 20 for improving tensile strength of the entire non-woven fabric current collector 100 is provided between the upper conductive non-woven fabric sheet 10A and the lower conductive non-woven fabric sheet 10B. The improvement of tensile strength refers to reinforcement of tension in a direction parallel to the main surface of the non-woven fabric current collector 100 and does not refer to reinforcement of tension in a direction vertical to the main surface of the non-woven fabric current collector 100. The improvement of tensile strength in a direction parallel to the main surface of the non-woven fabric current collector 100 may improve tensile strength of the non-woven fabric current collector 100 in all directions parallel to the main surface of the non-woven fabric current collector 100, that is, in a radial shape.

According to some embodiments, tension reinforcement in a direction parallel to the main surface of the non-woven fabric current collector 100 may be controlled to be applied to only a predetermined direction selected from among directions parallel to the main surface of the non-woven fabric current collector 100. For example, during a roll operation for continuously performing battery fabricating operations, such as slurry impregnation or pressing operation, or a jelly roll electrode forming operation inducing deformation of the non-woven fabric current collector 100, directions of the tension reinforcement may be limited to directions perpendicular to the revolving axis of a roller used in the above-stated operation or the center axis of a jelly roll. Therefore, during a packaging operation, such as unwinding or winding operation based on revolutions of a roller or formation of a jelly roll, deformation of the non-woven fabric current collector 100 may be suppressed and fracture or yield may be prevented. Detailed descriptions thereof will be given below with reference to FIG. 4.

Although the tension reinforcing layer 20 maintains a clear layer structure in the embodiment shown in FIGS. 1A and 1B, it is merely for convenience of explanation, and the present invention is not limited thereto. For example, in the actually fabricated non-woven fabric current collector 100, the upper conductive non-woven fabric sheet 10A and the lower conductive non-woven fabric sheet 10B are substantially integrated with each other, and the tension reinforcing layer 20 may be buried inside the same. As a result, the tension reinforcing layer 20 may not be clearly distinguished by the naked eyes. The characteristic may be exhibited in various degrees in embodiments of tension reinforcing layers 20A to 20D described below with reference to FIGS. 2A to 2D.

Adhesion between the upper conductive non-woven fabric sheet 10A and the lower conductive non-woven fabric sheet 10B may be mediated by the tension reinforcing layer 20. According to an embodiment, the upper conductive non-woven fabric sheet 10A and the lower conductive non-woven fabric sheet 10B may be respectively adhered to a top surface 20U and a bottom surface 20D of the tension reinforcing layer 20, and thus the upper conductive non-woven fabric sheet 10A and the lower conductive non-woven fabric sheet 10B may be combined with each other. According to an embodiment, for such a combination, the tension reinforcing layer 20 may include a combining material or a separate combining material may be employed.

According to another embodiment, the combination between the tension reinforcing layer 20 and the conductive non-woven fabric sheets 10A and 10B may be accomplished as the tension reinforcing layer 20 or the conductive non-woven fabric sheets 10A and 10B is/are partially melted by energy, such as heat, an infrared ray, a ultraviolet ray, an electron beam, or a ultrasound wave, and adhered to each other or both tension reinforcing layer 20 and the conductive non-woven fabric sheets 10A and 10B is/are partially melted and adhered to each other. Since no combining material is employed in the operation, environmental burden may be reduced.

According to another embodiment, the upper conductive non-woven fabric sheet 10A and the lower conductive non-woven fabric sheet 10B may be combined with each other by being bridged to each other via the tension reinforcing layer 20 based on fibrous characteristics thereof. As shown in FIG. 1B, conductive fibers constituting the upper conductive non-woven fabric sheet 10A and/or the lower conductive non-woven fabric sheet 10B may form a bridge BR via the tension reinforcing layer 20, and thus the upper conductive non-woven fabric sheet 10A and the lower conductive non-woven fabric sheet 10B may be mechanically combined and integrated with each other. According to embodiments, since the upper conductive non-woven fabric sheet 10A and the lower conductive non-woven fabric sheet 10B that are combined with each other via the tension reinforcing layer 20 contact and are connected to each other via the bridge BR, the upper conductive non-woven fabric sheet 10A and the lower conductive non-woven fabric sheet 10B are also electrically connected to each other, and thus the non-woven fabric current collector 100 may provide a current collector for a battery or a single conductive network for transferring electrons.

The bridge BR may be formed via a mechanical adhesion using a needle punching method, a spun lacing method, a stitch bonding method, or any of other suitable method. The needle punching method is a method of bridging the conductive fibers 10W of the upper conductive non-woven fabric sheet and the lower conductive non-woven fabric sheet by repeatedly and vertically inserting a large number of needles with hooks into the conductive non-woven fabric sheets and pulling the needles out of the conductive non-woven fabric sheets, where a velour type non-woven fabric may be fabricated by suitably designing shapes of the needles. The spun lacing method is a method of bridging the conductive non-woven fabric sheets of the upper conductive non-woven fabric sheet and the lower conductive non-woven fabric sheet by using high-velocity water jets instead of needles and is also referred to as a water-jet bridging method. The stitch bonding method is a method of sewing along the non-woven fabric current collector.

In the non-woven fabric current collector 100 according to the previous embodiments, the conductive fibers 10W are bridged and integrated with one another, and thus a product with sufficiently large porosity and sufficient softness may be fabricated by reducing an amount of the conductive fibers 10W. According to an embodiment, sufficient mechanical strength of an entire non-woven fabric current collector may be secured by arranging a tension reinforcing layer even if an amount of the conductive fibers 10W is reduced for increased porosity, and thus porosity of the non-woven fabric current collector may be easily controlled.

Furthermore, since conductive fibers of an upper conductive non-woven fabric sheet and a lower conductive non-woven fabric sheet form a separable physical contact and tensile strength is improved only in directions parallel to the main surface of the non-woven fabric current collector, contractions and expansions in directions perpendicular to upper and lower surfaces of the non-woven fabric current collector or an internal volume change within a limited volume of the non-woven fabric current collector may be easily absorbed, and thus a possible change of volume of an electrode during charging/discharging operations may be flexibly dealt with. Therefore, irreversibility like a crack of an electrode is not induced, and thus life expectancy of a battery may be improved.

FIGS. 2A to 2D are perspective views of tension reinforcing layers 20A, 20B, 20C, and 20D according to embodiments.

Figure 2A:
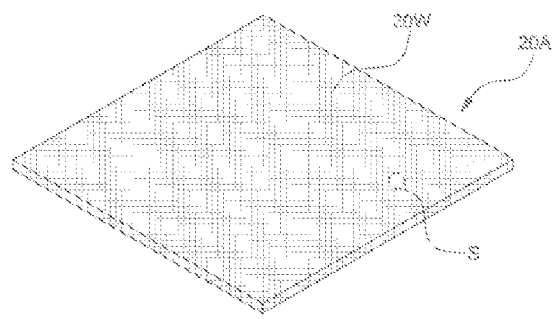
FIGS. 2A to 2D are perspective views of tension reinforcing layers according to embodiments.

The tension reinforcing layer 20A of FIG. 2A may have a non-woven fabric structure formed of a plurality of plurality of fibers 20W. Unlike the non-woven fabric sheets 10A and 10B in which a plurality of conductive fibers are only physically contacting one another, the non-woven fabric structure of the tension reinforcing layer 20A includes the plurality of fibers thermally fused with one another or has a foam structure, and thus tension of the tension reinforcing layer 20A is stronger than that of the non-woven fabric sheets 10A and 10B.

Figure 2B:
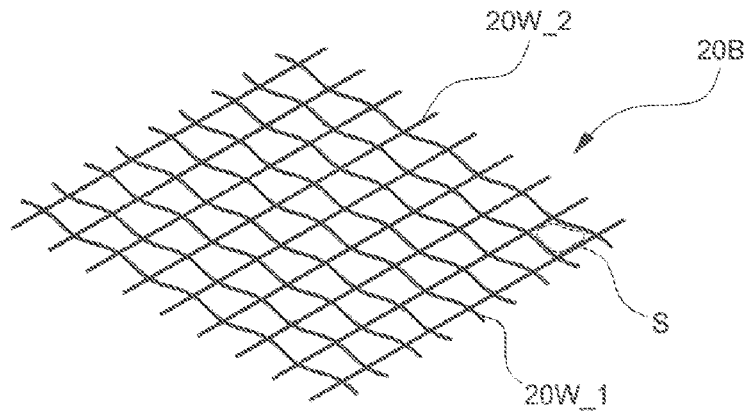

The tension reinforcing layer 20B of FIG. 2B has a woven structure in which a plurality of fibers are woven as latitudinal fibers 20W_1 and longitudinal fibers 20W_2. The woven structure is a merely example plain-woven structure. According to embodiments, the tension reinforcing layer 20B may have another woven structure, such as a twilled structure and a satin-woven structure, or may further have a suitable structure for selectively improving tensile strength in a certain direction.

Figure 2C:
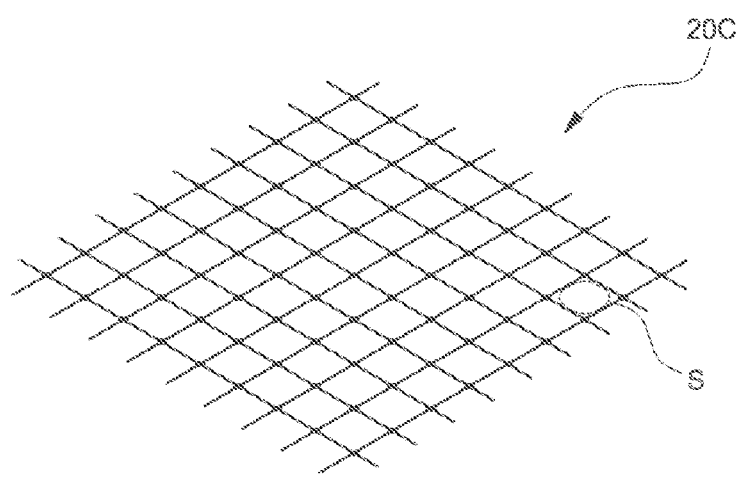
Figure 2D:
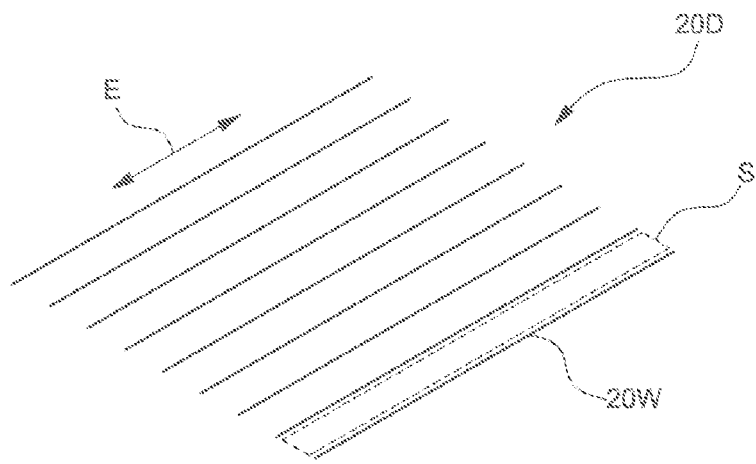

According to another embodiment, the tension reinforcing layer 20C may have a mesh structure 20M as shown in FIG. 2C. According to another embodiment, the tension reinforcing layer 20D may include the plurality of plurality of fibers 20W that extend in a certain direction with gaps S therebetween, as shown in FIG. 2D. The direction (arrow E) that the plurality of fibers 20W extend may be a direction perpendicular to revolving axes of rollers (10P_1, 10P_2, 20P, 30, 60, and 80 of FIG. 4) that are used for a rolling operation or a jelly roll forming operation for a packaging operation that are demanded in battery fabricating operations, such as a slurry impregnating operation or a pressing operation (e.g., the direction indicated by the arrow B of FIG. 4).

According to another embodiment, a tension reinforcing layer may have the non-woven fabric structure, the plain-woven structure, or the mesh structure as described above or a combination of two or more structures from among structures in which fibers extend in certain directions. For example, to increase tensile strength of a non-woven fabric current collector in a direction perpendicular to the revolving axis of a roller employed in battery fabricating operations, a modified tension reinforcing layer may have a structure in which the non-woven fabric as shown in FIG. 2A is blended with the structure as shown in FIG. 2D including a plurality of fibers extending in a direction perpendicular to the revolving axis of the roller.

The tension reinforcing layers 20A to 20D includes pores (S). The pores S may be provided by the plurality of conductive fibers 10W or meshes (FIG. 2C) that are adjacent to one another and constitute the tension reinforcing layers 20A to 20D. The upper conductive non-woven fabric sheet and the lower conductive non-woven fabric sheet communicate with each other via the pores S. Therefore, for example, the conductive wires 10W may be bridged to combine the upper conductive non-woven fabric sheet and the lower conductive non-woven fabric sheet to each other via the pores S of the tension reinforcing layers 20A to 20D. Furthermore, ions for a battery reaction may be smoothly transferred inside the non-woven fabric current collector 100 via the pores S of the tension reinforcing layers 20A to 20D, and a current flow may be secured.

According to some embodiments, an average size of the pores S of the tension reinforcing layers 20A to 20D may be equal to or greater than an average size of pores of the conductive non-woven fabric sheets 10A and 10B having a non-woven fabric structure. If active material particles are impregnated into the entire non-woven fabric current collector 100 for fabrication of an electrode and the pores S of the tension reinforcing layers 20A to 20D are sufficiently large, an electrically active material loaded onto a surface of the upper conductive non-woven fabric sheet or the lower conductive non-woven fabric sheet is not interfered by a tension reinforcing layer and may be uniformly impregnated throughout the non-woven fabric current collector.

The tension reinforcing layers 20A to 20D may contain a polymer material, a metal, or a combination thereof. A material constituting the tension reinforcing layers 20A to 20D may be identical to the material constituting the non-woven fabric current collector or may include materials different therefrom. For example, the polymer material may include a polymer material advantageous for fiberization. For example, a derivative or a mixture, such as polyethylene (PE), polypropylene (PP), polyethylene terephthalate (PET), polypropylene terephthalate (PPT), polyacrylonitryl (PAN), nylon, polyethylene naphthalate (PEN), polyether sulfone (PES), polyether etherketone (PEEK), polyphenylene sulfide (PPS), polyvinyliden fluoride (PVDF), and a copolymer thereof may be used as a polymer material for forming the tension reinforcing layer. However, the above-stated materials are merely examples, and the present invention is not limited thereto. The tension reinforcing layer may also contain a functional polymer material with suitable mechanical properties or a heat-resistance, such as highly strong, highly elastic, and magnetic contractive fiber. Furthermore, if necessary, the binder may be another conductive polymer-based material, petroleum pitch, or coal tar. However, the present invention is not limited to the above-stated materials, and any of various materials that is not dissolved by an electrode and exhibits certain binding force and stability in an electrochemical reaction may be applied thereto.

The metal may include a same material as the material constituting the non-woven fabric current collector or a material different therefrom. For example, the metal may include copper, aluminum, a stainless steel, nickel, or an alloy thereof.

Figure 3:
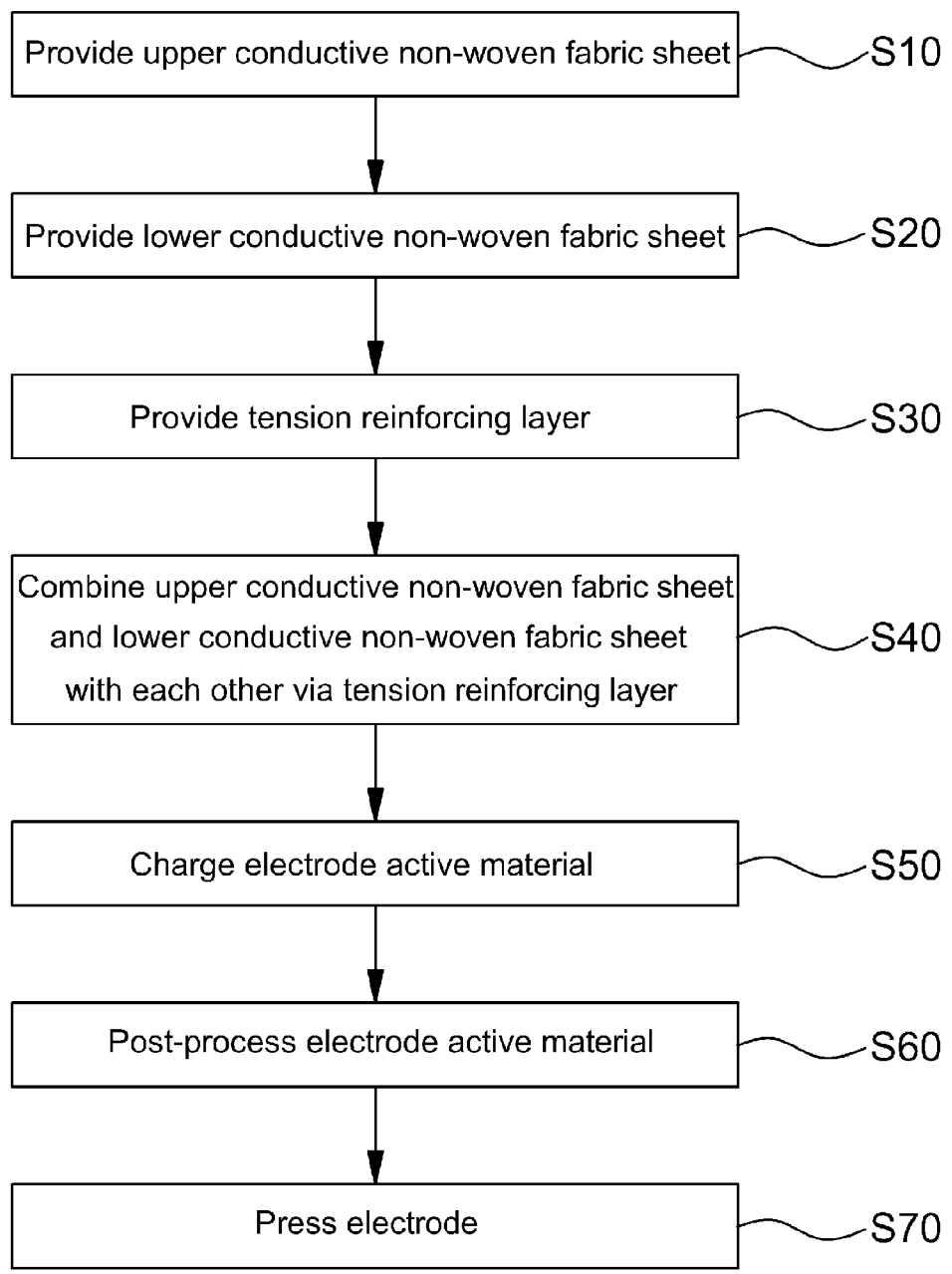
FIG. 3 is a flowchart showing a method of fabricating a battery according to an embodiment.
Figure 4:
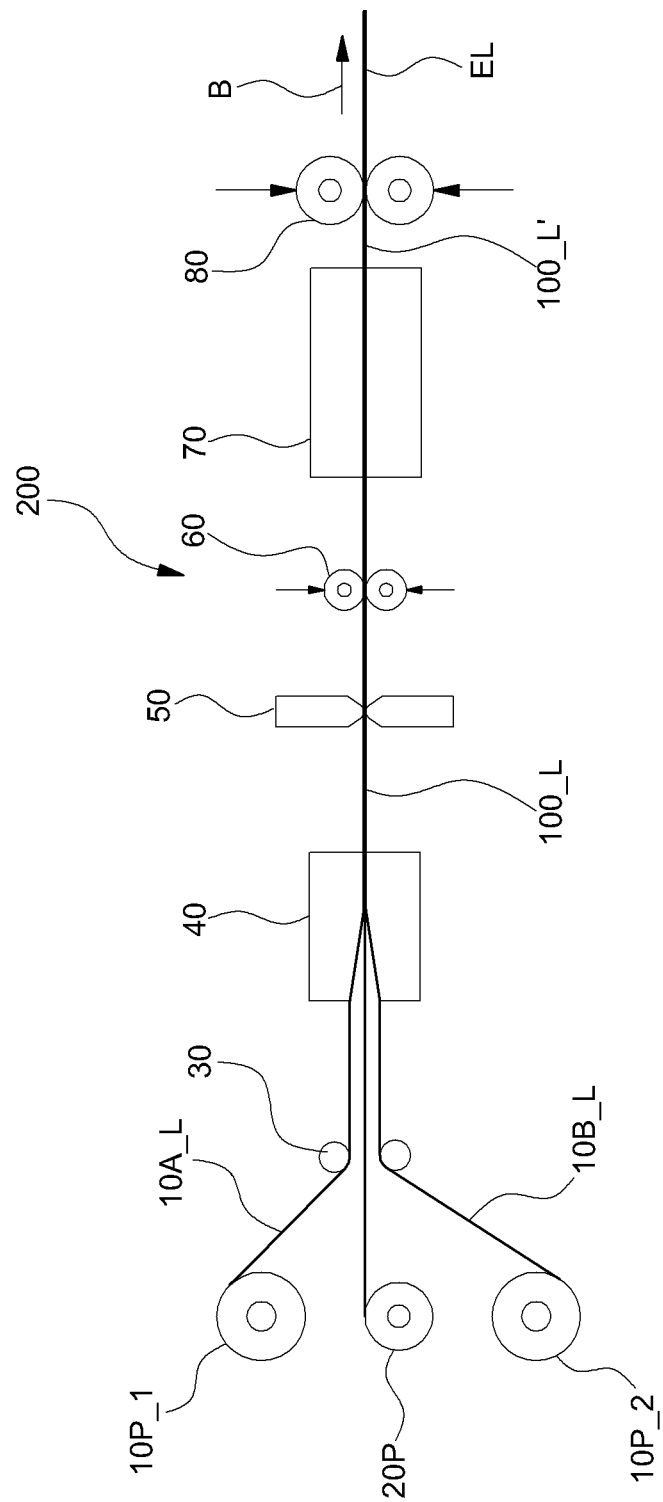
FIG. 4 is a diagram showing a system for fabricating a battery, according to an embodiment.

FIG. 3 is a flowchart showing a method of fabricating a battery according to an embodiment, and FIG. 4 is a diagram showing a system for fabricating a battery, according to an embodiment.

Referring to FIG. 3, an operation S10 for providing an upper conductive non-woven fabric sheet, an operation S20 for providing a lower conductive non-woven fabric sheet, and an operation S30 for providing a tension reinforcing layer are independently performed. Next, an operation S40 for combining the upper conductive non-woven fabric sheet and the lower conductive non-woven fabric sheet with each other via the tension reinforcing layer is performed.

Referring to FIGS. 3 and 4, the operations S10 to S40 may be continuously performed. For continuous operations, an upper conductive non-woven fabric sheet 10A_L and a lower conductive non-woven fabric sheet 10B_L may be provided by a first unwinding device 10P_1 and a second unwinding device 10P_2, respectively. Furthermore, a tension reinforcing layer 20_L may also be provided by a third unwinding device 20P. To arranged the tension reinforcing layer 20_L between the upper conductive non-woven fabric sheet 10A_L and the lower conductive non-woven fabric sheet 10B_L, the first to third unwinding devices 10P_1, 10P_2, and 20P may be arranged in an order identical to the order that the upper conductive non-woven fabric sheet 10A_L, the tension reinforcing layer 20_L, and the lower conductive non-woven fabric sheet 10B_L are stacked.

According to some embodiments, aligning members for aligning the conductive non-woven fabric sheets 10A_L and 10B_L and the tension reinforcing layer 20_L unwound from the first to third unwinding devices 10P_1, 10P_2, and 20P in parallel to one another to be suitably stacked, where the aligning members may be roller members 30. According to another embodiment, the roller members 30 may be provided with or replaced with a guiding member, such as a blade.

The conductive non-woven fabric sheets 10A_L and 10B_L and the tension reinforcing layer 20_L that are arranged in parallel with one another are combined with one another via a combining device 40. The combining device 40 may be a heater or a device for applying energy, such as heat, an infrared ray, an ultraviolet ray, an electron beam, or an ultrasound wave, for melted adhesion, according to types of the tension reinforcing layer 20_L. According to another embodiment, the combining device 40 may be a needle punching device, a spun lacing device, or a stitch bonding device for bridging the upper conductive non-woven fabric sheet 10A_L and the lower conductive non-woven fabric sheet 10B_L with each other.

A non-woven fabric current collector 100_L fabricated by the combining device 40 exhibits tensile stress reinforced by the tension reinforcing layer. The fabricated non-woven fabric current collector 100_L may be accommodated by a separate winding device (not shown). According to some embodiments, before being accommodated by the winding device, the non-woven fabric current collector 100_L may be pressed by a pressing device, such as a pressing roller member, or may experience a refining operation for removing moisture or foreign substances by being transferred via a drying device, such as a heating device. The fabricated non-woven fabric current collector 100_L may experience an operation S50 for charging an electrode active material, an operation S60 for post-processing the electrode active material, and an operation S70 for pressing an electrode.

According to some embodiments, as in operations after the combining device 40 as shown in FIG. 4, the non-woven fabric current collector 100_L may not be accommodated by the winding device and a charging operation for charging an electrically active material for forming a positive electrode or a negative electrode may be continuously performed (operation S50). The operation for charging the electrically active material may be an operation for loading the electrically active material in the form of slurries or powders. The electrically active material is impregnated by a slit die 50 into the non-woven fabric current collector 100_L in the form of slurries or powders via pores exposed on a surface of the non-woven fabric current collector 100_L. An amount and uniformity of the impregnated electrically active material may be controlled by appropriately adjusting a pressure applied to the slit die 50.

According to some embodiments, in an operation for loading an electrically active material, the electrically active material may be charged by using a spray or by passing the non-woven fabric current collector 100_L in a bath in which the electrically active material is dissolved or dispersed. Since the electrically active material impregnated via pores of the non-woven fabric current collector 100_L may be trapped inside the non-woven fabric current collector, such the operation may be performed by using a solution bath, whereas it is difficult to perform such the operation with respect to a metal foil current collector in the related art.

According to some embodiments, to control an impregnated amount of the electrically active material, a guide roll capable of applying a constant pressure may be provided. According to another embodiment, an impregnated amount of the electrically active material may be controlled by sweeping a surface of a non-woven fabric current collector by using a blade or a bar.

According to some embodiments, the electrically active material may be coated onto conductive fibers of the non-woven fabric current collector 100_L. To coat the electrically active material onto conductive fibers, a plating bath for electrolyte plating or electrolyteless plating may be provided. As the non-woven fabric current collector 100_L passes through an electrolyte or a metal ion solution in the plating bath, the electrically active material may be coated onto the conductive fibers, accompanied with reduction or extraction of metal ions. According to some embodiments, the electrically active material may be physically vapor-deposited onto the conductive fibers of the non-woven fabric current collector 100_L by using a sputtering method or an electron beam evaporation method or may be chemically vapor-deposited by using a suitable vapor precursor. To this end, a suitable atmospheric or vacuum chamber may be provided. The above-stated systems for forming the electrically active material may be used in combinations.

A non-woven fabric current collector 100_L' charged with an electrically active material may be post-processed by being passed through a drying device or a heat treating device 70, such as a heater (operation S60). Next, as indicated by the arrow, the post-processed non-woven fabric current collector 100_L' is pressed by a roller member 80 capable of applying a pressure thereto, and thus thickness and electrode density of the non-woven fabric current collector 100_L' may be controlled.

A fabricated non-woven fabric electrode EL may be continuously discharged by a fabrication system 200 as indicated by the arrow B and may be accommodated by a winding device (not shown). The accommodated non-woven fabric electrode EL may be suitably cut and used for packaging batteries. According to some embodiments, the fabricated non-woven fabric electrode EL may not be accommodated and may continuously experience later operations, such as a tab forming operation, an separator stacking operation, an electrolyte impregnating operation, or a stacking operation for packaging, or a jelly roll forming operation.

A non-woven fabric current collector consisting of a non-woven fabric sheet without a tension reinforcing layer may exhibit a tensile elongation ratio of 20% or higher due to stresses applied in continuous operations employing the above-stated first to third unwinding devices 10P_1, 10P_2, 20P, and 30 due to fibrous characteristics thereof. In this case, it is substantially impossible to continuously transfer the non-woven fabric current collector by using a roller. Furthermore, even if an extreme defect like break does not occur, if the non-woven fabric current collector is elongated, electric contacts between conductive fibers and an electric contact between surfaces of the conductive fibers and an electrically active material may be deteriorated, and thus it is demanded to control and suppress elongation ratio. According to an embodiment, tensile elongation ratio of a non-woven fabric current collector is controlled to be less than or equal to 20% by arranging a tension reinforcing layer and may preferably be controlled to be within a range from about 0.1% to about 10%. Therefore, battery fabricating operations are performed at a same level as the battery fabricating operations using a metal foil current collector in the related art and operational advantages of a non-woven fabric current collector may be maximized.

Figure 5:
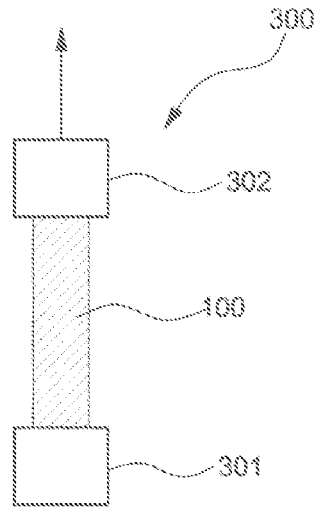
FIG. 5 is a diagram showing a tensile elongation ratio measuring device according to an embodiment.

FIG. 5 is a diagram showing a tensile elongation ratio measuring device 300 according to an embodiment.

Referring to FIG. 5, tensile elongation ratio of a non-woven fabric current collector used in the present specification may be measured by the tensile elongation ratio measuring device 300. A current collector 100 for measurement may be fabricated by dicing a non-woven fabric current collector combined with a tension reinforcing layer to a piece with width of 20 mm and length of 40 mm. An end portion of the fabricated current collector 100 for measurement is fixed to a base unit 301, whereas the other end portion of the current collector 100 for measurement is fixed to a chuck unit 302.

The chuck unit 302 may be displaced in a lengthwise direction of the current collector 100 for measurement. A rod cell for measuring a weight applied to the non-woven fabric current collector 100 due to displacement of the chuck unit 302 may be combined with either the base unit 301 or the chuck unit 302.

For measurement, the non-woven fabric current collector 100 is elongated by moving the chuck unit 302 at a certain speed, e.g., 15 mm/min. As the current collector 100 for measurement is deformed, weight measured by the rod cell will gradually increase. A deformation ratio and a yield strength to a point at which weight no longer increases and becomes constant or decreases are measured. According to an embodiment, a non-woven fabric current collector including a tension reinforcing layer exhibits a deformation ratio within a range from about 0.1% to about 10%, where a yield strength (=tensile strength of the non-woven fabric current collector per unit area (Kg/cm$^2$)×thickness of the non-woven fabric current collector (cm)) measured at this point is within a range from about 0.1 kgf/cm to about 100 kgf/cm and is preferably within a range from about 0.2 kgf/cm to about 50 kgf/cm. Within the range, deformation of the non-woven fabric current collector is suppressed, thus not only enabling continuous operations, but also preventing deterioration of electric contacts between conductive fibers and electric contacts between surfaces of the conductive fibers and an electrically active material.

It is not preferable to increase porosity while embodying a uniform porosity throughout a non-woven fabric current collector, because yield strength of the non-woven fabric current collector decreases unless tension is reinforced. However, according to an embodiment, a tension reinforcing layer may improve porosity and secure a tensile stress suitable for continuous operations at the same time.

Figure 6A:
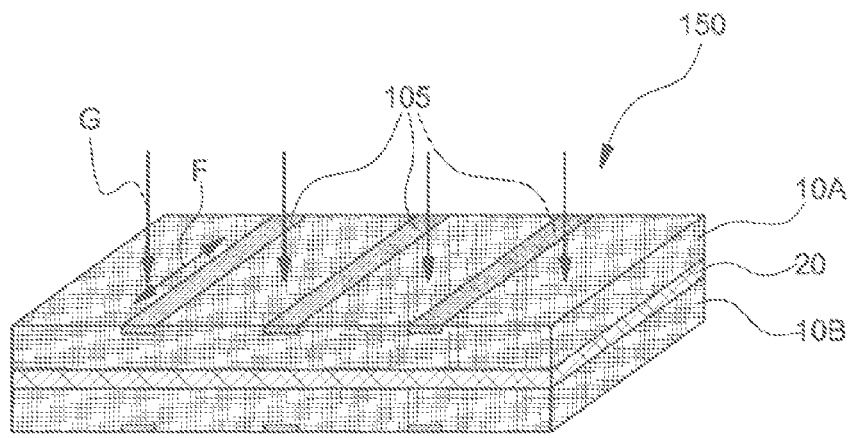
FIGS. 6A and 6B are perspective views showing a method of fabricating an electrode using a non-woven fabric current collector according to other embodiments of the present invention.
Figure 6B:
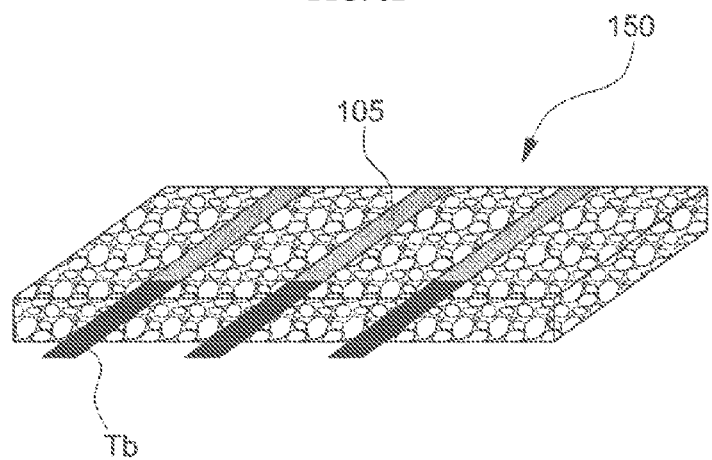

FIGS. 6A and 6B are perspective views showing a method of fabricating an electrode using a non-woven fabric current collector 150 according to other embodiments of the present invention. The non-woven fabric current collector 150 may be diced and utilized for fabrication of electrodes as shown in FIGS. 6A and 6B or may experience an electrode forming operation by being continuously provided in a manner suitable for continuous operations as shown in FIG. 4.

Referring to FIG. 6A, the non-woven fabric current collector 150 may include a conductive pattern 105 that is formed on at least one surface of the non-woven fabric current collector 150 to block pores of the non-woven fabric current collector 150. The conductive pattern 105 may be formed on both main surfaces of the non-woven fabric current collector 150 or any one of the main surfaces of the non-woven fabric current collector 150.

The conductive pattern 105 may be a linear pattern including lines that are apart from one another at a certain interval to expose pores on a surface of the non-woven fabric current collector 150. The lines of the linear pattern may be aligned along a direction F perpendicular to a direction that the non-woven fabric current collector 150 is transferred (e.g., the direction indicated by the arrow B in FIG. 4) for continuous operations. According to another embodiment, the lines of the linear pattern may be aligned to be parallel with a line interconnecting a positive electrode and a negative electrode of a battery that face each other when the battery is packaged. The conductive pattern 105 may help tension reinforcement of the non-woven fabric current collector 150 together with the tension reinforcing layer 20.

According to some embodiments, the conductive pattern 105 may be fabricated b partially fusing conductive fibers at surfaces of the non-woven fabric sheets 10A and 10B to one another. According to another embodiment, the conductive pattern 105 may also be provided by coating or fusing a metal pattern layer onto surfaces of the non-woven fabric sheets 10A and 10B. Formation of the conductive pattern 105 may also be performed via an ultrasound welding operation, a thermal welding operation, or a soldering operation.

Surfaces of the non-woven fabric current collector 150 excluding portions blocked by the conductive pattern 105 may communicate with the interior of the non-woven fabric current collector 150 via exposed pores. An operation for loading an electrically active material to the non-woven fabric current collector 150 having formed thereon the conductive pattern 105 may be performed as indicated by an arrow. The non-woven fabric current collector excluding the portions masked by the conductive pattern 105 may be uniformly charged with the electrically active material throughout. The conductive pattern 105 may be exposed by cleaning surfaces of the non-woven fabric current collector 150 charged with the electrically active material after the loading operation is completed. Selectively, a pressing operation for controlling density and thickness of an electrode may be performed.

Referring to FIG. 6B, a battery tab or lead Tb is formed on the exposed conductive pattern 105. Since the battery tab or lead Tb may be soldered or fused to the conductive pattern 105 without being interfered by an electrically active material charged to the non-woven fabric current collector 150, substantially low-resistance contact may be formed between the battery tab or lead Tb and conductive fibers of the non-woven fabric current collector and it is easy to form a battery tab or lead for the conductive pattern 105.

Figure 7:
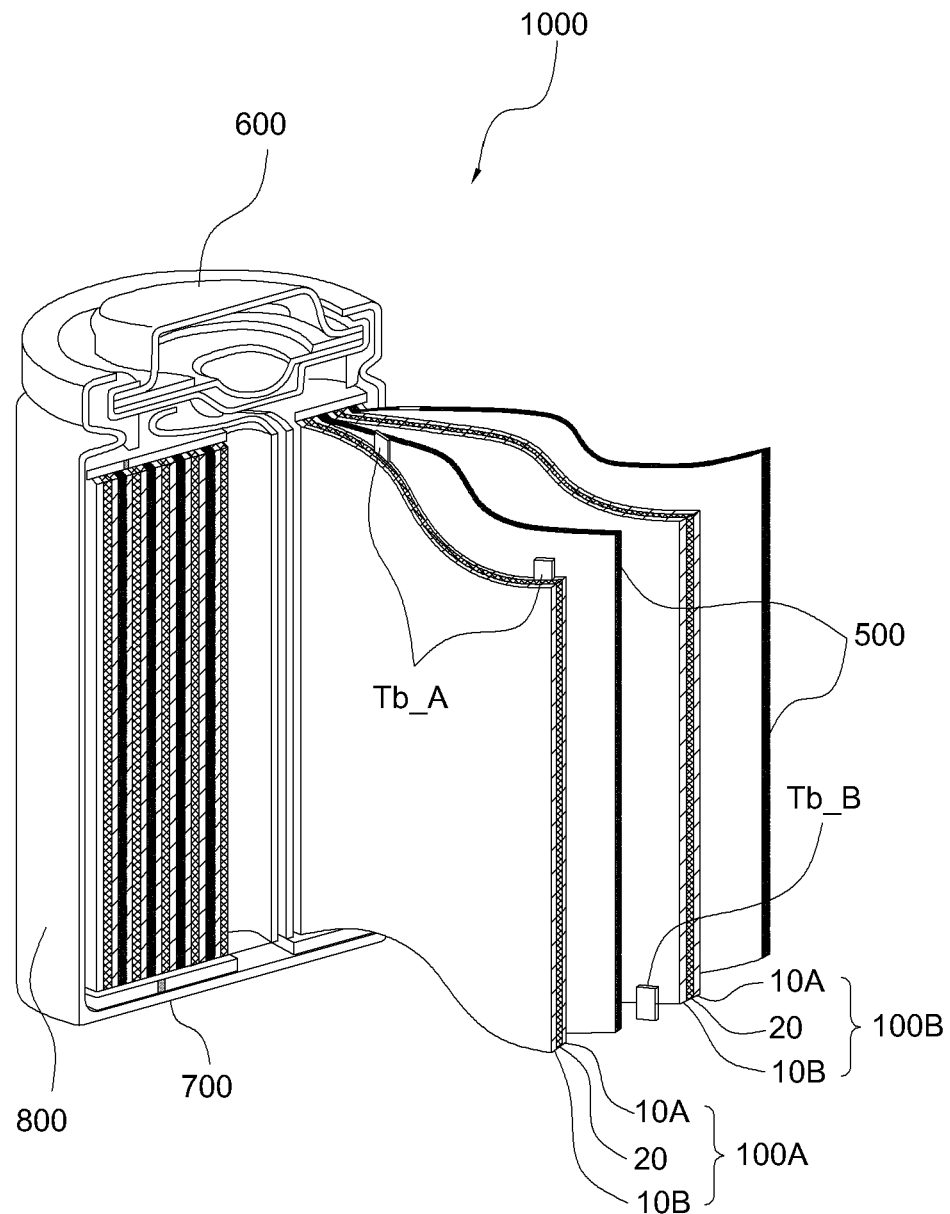
FIG. 7 is an exploded view of a battery employing a non-woven fabric current collector according to an embodiment.

FIG. 7 is an exploded view of a battery 1000 employing a non-woven fabric current collector according to an embodiment.

Referring to FIG. 7, the battery 1000 may be a common cylindrical battery. For increased battery reaction area, the positive electrode 100A and the negative electrode 100B employing the non-woven fabric current collector may form a jelly roll structure formed by being alternately wound with respect to each other. However, it is merely an example, and only one of a positive electrode and a negative electrode may be configured using a non-woven fabric current collector. Furthermore, the battery 1000 may also be fabricated as a coin-type battery, a hexahedral battery, or a flexible battery of any of various shapes using fibers.

As described above, the non-woven fabric current collector may include the upper conductive non-woven fabric sheet 10A, the lower conductive non-woven fabric sheet 10B, and the tension reinforcing layer 20 arranged therebetween. An electrically active material may be trapped inside the non-woven fabric sheets 10A and 10B in the form of particles or may be coated onto conductive fibers of the non-woven fabric current collector.

Tabs or leads Tb_A and Tb_B may be formed on side surfaces of electrode structures 100a and 100b. Numbers of the tabs or leads Tb_A and Tb_B may be suitably determined to reduce internal resistance. The tabs or leads Tb_A and Tb_B may be connected to a positive electrode 600 and a negative electrode 700 of the battery 1000 inside a housing 800, respectively.

A separator 500 may be arranged between the positive electrode 100A and the negative electrode 100B for insulation therebetween. For example, the separator 500 may be a polymer-based micro-porous film, a woven fabric, a non-woven fabric, a ceramic, an intrinsic solid polymer electrolyte film a gel solid polymer electrolyte film, or a combination thereof. The intrinsic polymer electrolyte film may contain a straight-chain polymer material, or a bridge polymer material, for example. The gel solid polymer electrolyte film may be a plasticizer-containing polymer, a filler-containing polymer, a pure polymer, or a combination thereof. The solid electrolyte film may contain a polymer matrix, an additive, and an electrolyte consisting of any one from among polyethylene, polypropylene, polyimide, polysulfone, polyurethane, polyvinyl chloride, polystyrene, polyethylene oxide, polypropylene oxide, polybutadiene, cellulose, carboxymethyl cellulose, nylon, polyacrylonitrile, polyvinylidene fluoride, poly tetrafluoroethylene, a copolymer of vinylidene fluoride and hexafluoropropylene propylene, a copolymer of vinylidene fluoride and trifluoroethylene, a copolymer of vinylidene fluoride and tetrafluoroethylene, poly (methyl acrylate), poly acrylate, polyethyl acrylate, polymethyl methacrylate, polyethyl methacrylate, polybutyl acrylate, polybutyl methacrylate, polyvinyl acetate, and polyvinyl alcohol or a combination thereof, for example. However, the above-stated materials for forming the separator 500 are merely examples, and any material that is easily deformed, features excellent mechanical strength, is not torn or cracked by deformations of the electrodes 100A and 100B and features an arbitrary suitable electron insulation and excellent ion conductivity may be selected for the separator 500.

The separator 500 may be a single-layer film or a multi-layered film, where the multilayered film may be a stacked structure of same single layer films or a stacked structure of single layer films formed of different materials. For example, the stacked structure may have a structure including a ceramic coating layer formed on a surface of a polymer electrode film, such as a polyolefin film. In consideration of durability, shutdown function, and safety of a battery, thickness of the separator 500 may be from about 10 µm to about 300 µm, may preferably be from about 10 µm to about 40 µm, and more preferably, may be from about 10 µm to about 25 µm.

In a housing 800, a suitable aqueous electrolyte containing a salt, such as potassium hydroxide (KOH), potassium bromide (KBr), potassium chloride (KCL), zinc chloride ($ZnCl_2$), and sulfuric acid $H_2SO_4$ may be absorbed to the electrode structures 100a and 100b and/or the separator 500, thereby completing the battery 1000. According to another embodiment, the battery 1000 may be a non-aqueous electrolyte, such as ethylene carbonate, propylene carbonate, dimethyl carbonate, or diethyl carbonate containing a lithium salt, such as $LiClO_4$ or $LiPF_6$. However, the present invention is not limited thereto. Furthermore, although not shown, a suitable cooling device or a battery managing system for controlling stability and/or power supply characteristics while the battery 1000 is being used may be further attached to the battery 1000.

Due to fibrous characteristics thereof, an electrode employing the non-woven fabric current collector may be easily deformed. Furthermore, since an electrically active material and a conductive network are substantially uniformly mixed throughout the entire volume of an electrode structure, even if thickness of an electrode is increased for adjusting capacity of a battery, deterioration of battery performance, which occurs in a conventional battery structure obtained by coating an active material layer on a metal foil, does not occur. Therefore, an electrode may have any of various volumes.

Furthermore, due to easy deformability of a fabric electrode structure, an electrode may not only be fabricated as a jelly roll type as shown in FIG. 7, but also be 3-dimensionally deformed by being stacked, bent, and wound and may not only be a cylindrical battery as described above, but also be a hexahedral battery, a pouch-type battery, or one of batteries having various volumes and shapes integrated to a fabric product like a cloth or a bag. Furthermore, it should be understood that the above-stated electrode structures may be applied to a cathode, an anode, or both of the same in a single battery.

Furthermore, the above-stated non-woven fabric current collectors may be applied not only to a lithium ion battery, but also to a lithium metal battery, a lithium air battery, a nickel hydride battery, or a NaS battery. However, it is merely an example, and one of ordinary skill in the art will understand that the present invention is not limited thereto.

While the present invention has been particularly shown and described with reference to embodiments thereof, it will be understood by those of ordinary skill in the art that various changes in form and details may be made therein without departing from the spirit and scope of the present invention as defined by the following claims.

The invention claimed is:

1. A non-woven fabric current collector comprising:
   a upper conductive non-woven fabric sheet and a lower conductive non-woven fabric sheet including a network of a conductive fibers; and
   a tension reinforcing layer that has a greater tensile strength than the conductive non-woven fabric sheets, arranged between the upper conductive non-woven fabric sheet and the lower conductive non-woven fabric sheet, mediates adhesion between the upper conductive non-woven fabric sheet and the lower conductive non-woven fabric sheet, and has pores via which the upper conductive non-woven fabric sheet and the lower conductive non-woven fabric sheet communicate with each other.

2. The non-woven fabric current collector of claim 1, wherein tensile elongation ratio of the non-woven fabric current collector is within a range from about 2% to about 10%.

3. The non-woven fabric current collector of claim 1, wherein yield strength of the non-woven fabric current collector is within a range from about 0.1 kgf/cm to about 100 kgf/cm.

4. The non-woven fabric current collector of claim 1, wherein the conductive fibers comprise carbon fibers, conductive polymer fibers, polymer fibers coated with a metal layer or a conductive polymer layer, metal filaments or hollow metal fibers.

5. The non-woven fabric current collector of claim 1, wherein a metal layer or a conductive polymer layer is formed on the conductive fibers.

6. The non-woven fabric current collector of claim 1, wherein the upper conductive non-woven fabric sheet or the lower conductive non-woven fabric sheet further comprises a conductive material and a binder for fixing the conductive material on the conductive fibers.

7. The non-woven fabric current collector of claim 6, wherein the conductive material comprises carbon black, acetylene black, ketjen black, fine carbon like superfine graphite particles, a nano metal particle paste, an indium tin oxide (ITO) paste, or carbon nanotubes.

8. The non-woven fabric current collector of claim 1, wherein the upper conductive non-woven fabric sheet or the lower conductive non-woven fabric sheet further comprises fiberized linear binders mixed with the conductive fibers.

9. The non-woven fabric current collector of claim 4, wherein the metal filaments contains a stainless steel, aluminum, nickel, titanium, copper, silver, gold, cobalt, tin, bismuth, lead, antimony, zinc, iron, cadmium, an alloy thereof, or a metal compound to be alloyed/dealloyed with lithium.

10. The non-woven fabric current collector of claim 1, further comprising a coating layer of an electrically active material on the conductive fibers of the upper conductive non-woven fabric sheet and the lower conductive non-woven fabric sheet.

11. The non-woven fabric current collector of claim 9, wherein the metal filaments comprise two or more types of metal filaments containing different metals.

12. The non-woven fabric current collector of claim 1, wherein the upper conductive non-woven fabric sheet and the lower conductive non-woven fabric sheet are combined with each other by being bridged with each other via the pores of the tension reinforcing layer.

13. The non-woven fabric current collector of claim 1, wherein an average size of the pores of the tension reinforcing layer is identical to or greater than an average size of pores in the network of the upper conductive non-woven fabric sheet and the lower conductive non-woven fabric sheet.

14. The non-woven fabric current collector of claim 1, wherein the tension reinforcing layer comprises a non-woven fabric structure, a woven fabric structure, a mesh structure, a structure including fibers extending in a certain direction, or a combination thereof.

15. The non-woven fabric current collector of claim 1, wherein the tension reinforcing layer selectively increases tensile strength in a certain direction parallel to the main surface of the non-woven fabric current collector.

16. The non-woven fabric current collector of claim 15, wherein the direction of increased tensile strength is a direction perpendicular to the revolution axis of a roller employed in a rolling operation for continuously performing battery fabricating operations or a direction perpendicular to the center axis of a roller employed in a jelly roll forming operation.

17. The non-woven fabric current collector of claim 1, wherein the tension reinforcing layer comprises a polymer material, a metal, or a combination thereof.

18. The non-woven fabric current collector of claim 1, wherein the non-woven fabric current collector further comprises a conductive pattern that partially blocks pores between networks of the conductive fibers on at least one surface of the non-woven fabric current collector.

19. The non-woven fabric current collector of claim 18, wherein the conductive pattern comprises a linear pattern including lines that are apart from one another at a certain interval to expose pores on the surface of the non-woven fabric current collector.

20. The non-woven fabric current collector of claim 1, wherein a battery tab or lead is formed on the lines.

21. The non-woven fabric current collector of claim 10, wherein tensile elongation ratio of the non-woven fabric current collector is within a range from about 2% to about 10%.

22. The non-woven fabric current collector of claim 10, wherein yield strength of the non-woven fabric current collector is within a range from about 0.1 kgf/cm to about 100 kgf/cm.

23. The non-woven fabric current collector of claim 10, wherein the conductive fibers comprise carbon fibers, conductive polymer fibers, polymer fibers coated with a metal layer or a conductive polymer layer, metal filaments or hollow metal fibers.

24. The non-woven fabric current collector of claim 10, wherein the upper conductive non-woven fabric sheet and the lower conductive non-woven fabric sheet are combined with each other by being adhered to the tension reinforcing layer.

* * * * *